(No Model.) 4 Sheets—Sheet 1.
J. REDDING.
MECHANISM FOR REGULATING SPEED OF PULLEYS, &c.

No. 526,199. Patented Sept. 18, 1894.

Witnesses.
Alvan Macauley
Wm DuVal Brown

Inventor
Jacob Redding.
By Chas. E. Adamson
His Attorney.

(No Model.) 4 Sheets—Sheet 2.
J. REDDING.
MECHANISM FOR REGULATING SPEED OF PULLEYS, &c.
No. 526,199. Patented Sept. 18, 1894.
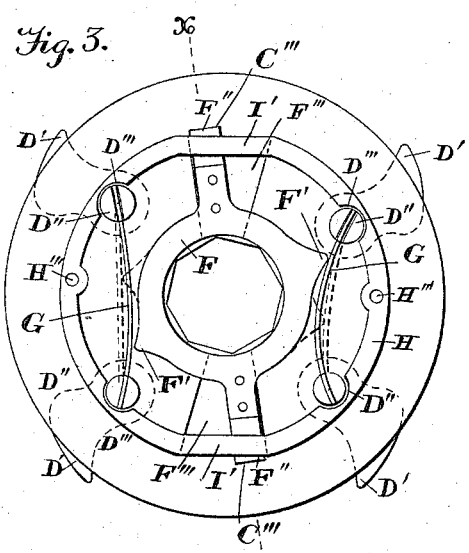
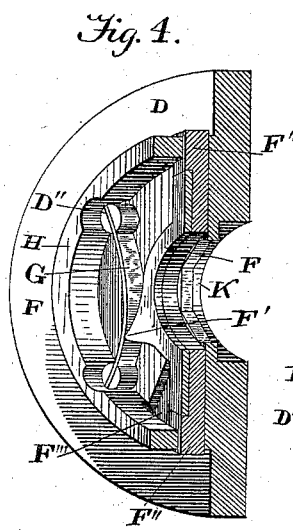
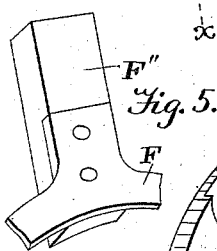
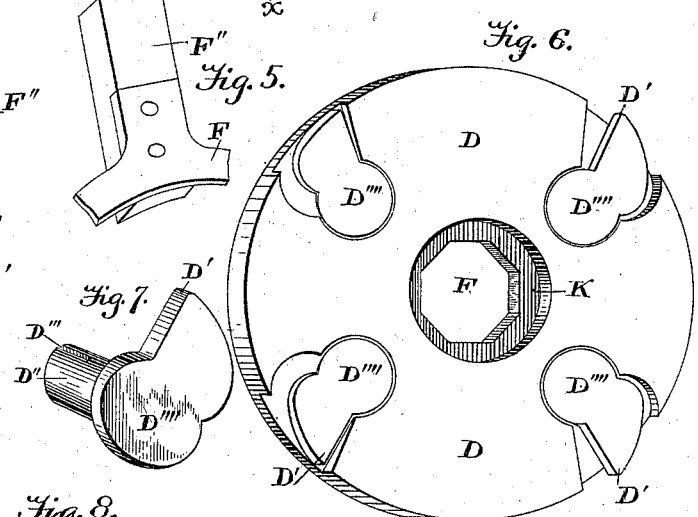
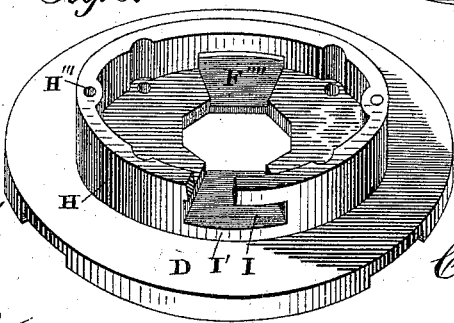
Witnesses,
Alvan Macauley
Wm. DuVal Brown
Inventor
Jacob Redding
By Chas. E. Adamson
His Attorney.

Figure 16:
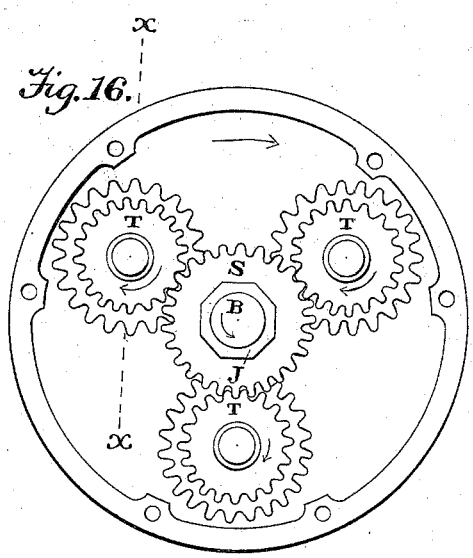

(No Model.) 4 Sheets—Sheet 3.
J. REDDING.
MECHANISM FOR REGULATING SPEED OF PULLEYS, &c.
No. 526,199. Patented Sept. 18, 1894.
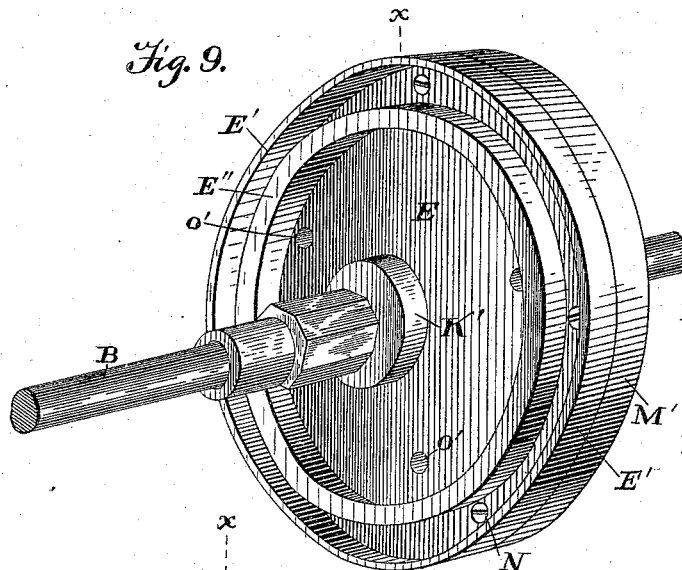
Fig. 9.
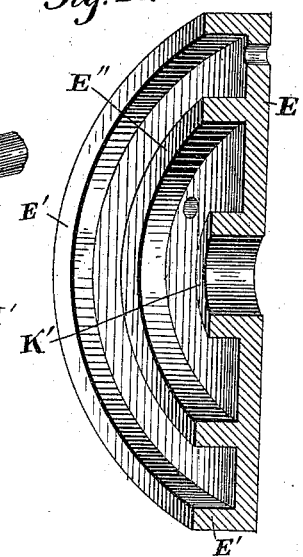
Fig. 10.
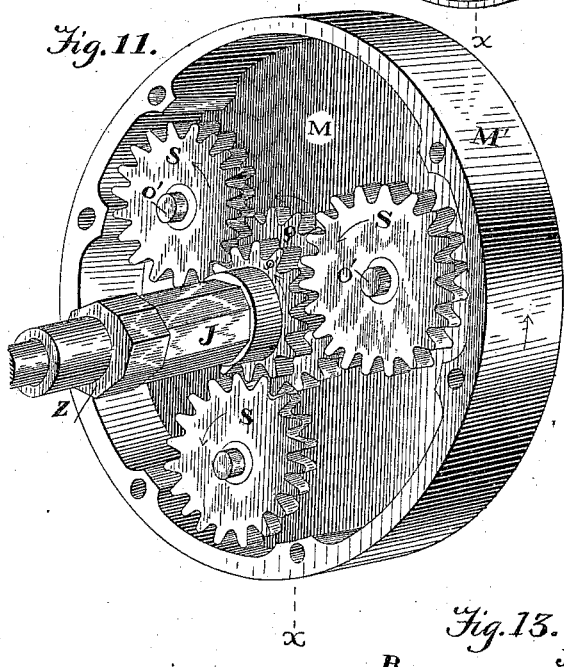
Fig. 11.
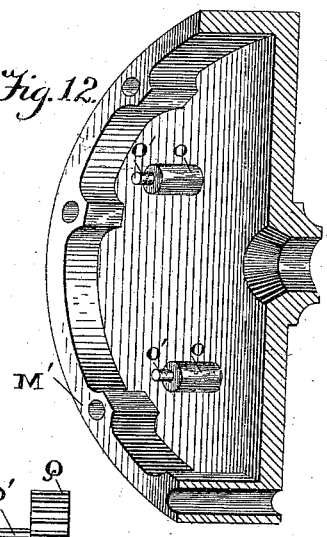
Fig. 12.
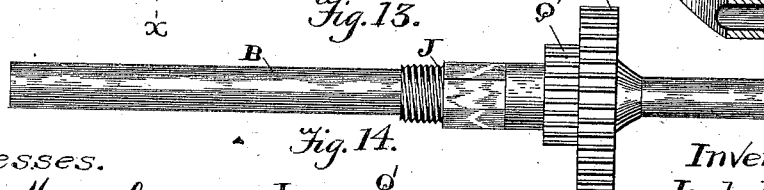
Fig. 13.
Fig. 14.
Witnesses.
Abran Macauley.
Wm Duval Brown
Inventor
Jacob Redding
By
Chas E. Adamson
His Attorney.
Fig. 16.

(No Model.) 4 Sheets—Sheet 4.

J. REDDING.
MECHANISM FOR REGULATING SPEED OF PULLEYS, &c.

No. 526,199. Patented Sept. 18, 1894.

Witnesses.
Alvan Macauley
Wm N Brown

Inventor
Jacob Redding
By Chas. E. Adamson
His Attorney.

UNITED STATES PATENT OFFICE.

JACOB REDDING, OF NEW CASTLE, INDIANA.

MECHANISM FOR REGULATING SPEED OF PULLEYS, &c.

SPECIFICATION forming part of Letters Patent No. 526,199, dated September 18, 1894.

Application filed February 23, 1894. Serial No. 501,201. (No model.)

*To all whom it may concern:*

Be it known that I, JACOB REDDING, a citizen of the United States, residing at New Castle, in the county of Henry and State of Indiana, have invented certain new and useful Improvements in Mechanism for Increasing, Decreasing, or Reversing the Speed or Movement of Line-Shafts or Pulleys; and I do hereby declare the following to be a full, clear, and exact description of the invention, such as will enable others skilled in the art to which it appertains to make and use the same.

This invention relates to a new and useful improvement in clutch speed mechanism and consists in the construction and arrangement of parts hereinafter described and definitely pointed out in the claims.

The aim and purpose of this invention is to construct a clutch speed mechanism whereby the speed of a pulley actuated by a drive shaft may be increased or decreased, and the direction of the movement of the pulley may be reversed without increasing or decreasing the speed of, or reversing the movement of the actuating shaft, and also in constructing a clutch speed mechanism that will be simple in construction, and adapted to be used with various kinds of machinery. I attain these objects by the mechanism illustrated by the accompanying drawings, in which—

Figure 1:
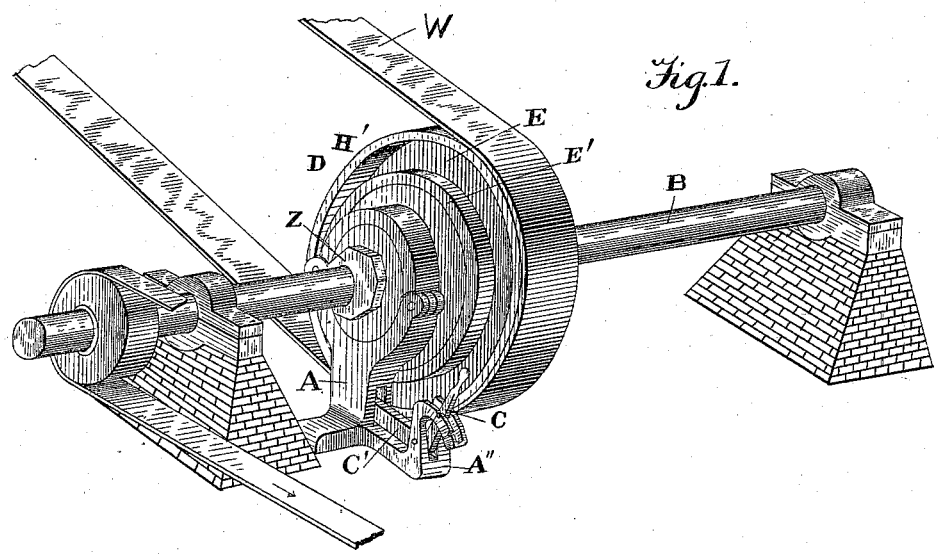
Figure 2:
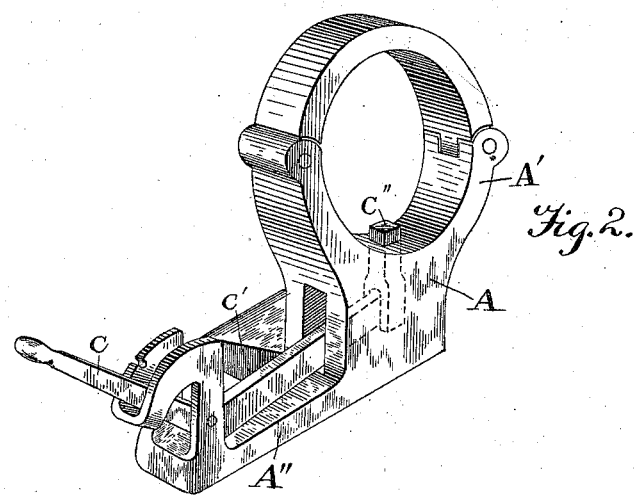
Figure 15:
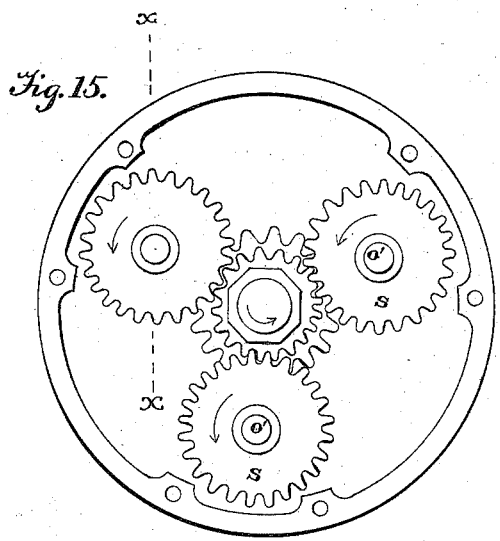
Figure 17:
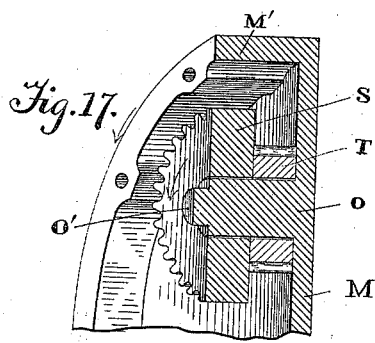
Figure 18:
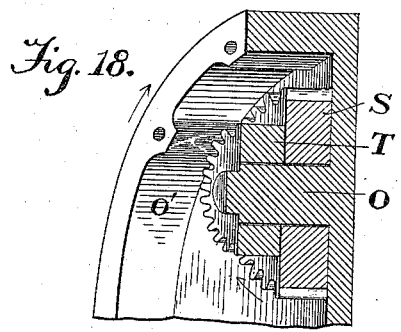
Figure 19:
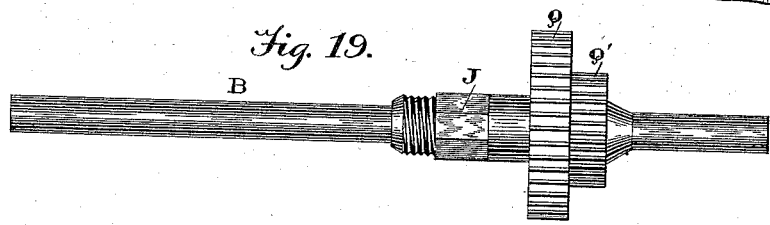

Figure 1 is a general view of a line shaft, driven by an engine, having a pulley wheel thereon, the said shaft being provided with my clutch speed mechanism having a belt working on the pulley wheel for driving some machine at a regular or increased speed. Fig. 2 is a perspective view of the clutch stopping and releasing mechanism. Fig. 3 is a view looking directly in the center, or shaft hole of the said clutch disk. Fig. 4 is a vertical section taken on line X X of said Fig. 3. Fig. 5 is a detail view of one end of the clutch lever. Fig. 6 is a perspective view of the inner side of the clutch disk showing two of the clutches thrown out and two thrown in. Fig. 7 is a perspective view of one of the dogs. Fig. 8 is a perspective view of the outer side of the clutch disk with the outer casing removed and all the clutches and working parts removed from the said disk. Fig. 9 is a perspective view of the pinion disk and central disk in operative position with the clutch disk removed. Fig. 10 is a vertical section of the central disk of Fig. 9 taken on line X X. Fig. 11 is a perspective view of the pinion disk shown in Fig. 9 after it has been divided leaving the central disk off, exposing the inner pinions. Fig. 12 is a vertical section of the pinion disk shown in Fig. 11 taken on line X X of said Fig. 11 with the pinions removed. Fig. 13 is a longitudinal view of the actuating shaft showing the pinions and sleeve thereon. Fig. 14 is a view of the sleeve and pinion which are cast or otherwise secured together. Fig. 15 is a direct side view of the pinion disk or part of the wheel that contains the pinions, the said view taken as if looking directly in the end of the actuating shaft, exposing the pinions. Fig. 16 is a view taken of the same parts, showing the pinions reversed on their journals, as in position for a disk that will run forward at a regular speed and backward at an increased speed. Fig. 17 is a vertial section of a portion of Fig. 15, taken on line X X of the said figure. Fig. 18 is a vertical section of a portion of Fig. 16 taken on line X X of the said figure, and Fig. 19 is a longitudinal view of the actuating shaft fitted with its pinion and sleeve pinion in position to make a forward or reversing movement of the wheel.

Similar letters refer to similar parts throughout the several views.

My invention consists of four main parts: a clutch stopping mechanism; a clutch disk; a central disk, and a pinion disk, or wheel, all of which are combined together on an actuating or line shaft. In Fig. 1 I show a line shaft with my clutch speed mechanism attached to the said shaft, and a belt working on the mechanism indicating that the said belt is further connected to some machine which is to be run at times at a higher speed, or at a backward movement. The said line shaft is driven by an engine not shown in the said figure. In this arrangement of my invention it is intended to regulate the speed of the line shaft by the engine which will run the said shaft at all times at the same speed and in one direction. If the said line shaft is to be run at a fast or slow speed, or forward or backward, then the engine belt will be run directly on the clutch mechanism instead of running on the rigid pulley, as is shown in Fig. 1, and as will be hereinafter more fully explained. The casting A is intended to be fastened to some frame work or to the ceiling or floor near the line shaft B. This casting is made to encircle a portion of the clutch speed mechanism as most clearly shown in Fig. 1. The upper part A' of the said casting is hinged or pivoted to the lower part for convenience in adjusting and removing it from the said mechanism. The lower part of the said casting extends outward at A'' so as to form a suitable fulcrum for the lever C. This lever extends at C' into the main part of the casting and to the inner end is attached a stop stud C'', all as shown and indicated by dotted lines in Fig. 2. When the lever C is up the stud C'' is down, allowing the clutch mechanism to revolve freely, at its regular speed, but when the stud is thrown up it strikes one end of the clutch bar F at C''' moving it over, throwing the dogs D' inward thereby releasing the said clutches from their pressure against the rim E' and causing the clutch disk D to stand still.

The operation of the disk D may be more fully understood by referring to Sheet 2 of the drawings. When the disk is clutched to the central disk E the clutch bar F stands at rest in the position shown in Fig. 3. In this position the springs G hold it, and at the same time the said springs hold the dogs with their longest points outward. When one of the ends C''' of the bar F comes in contact with the stud C'' in the rim A' the said bar instantly moves over or turns on its axis to a slight degree as indicated by dotted lines in Fig. 3. This moves the two springs G outward by the studs or points F' pressing against them, as indicated by dotted lines in said Fig. 3. Each one of the springs G is connected to two of the dogs by the projections D'' of the said dogs extending through the disk D, as shown in Figs. 3 and 4. One end of each spring G is secured in one of the slots D''' rigidly, while the other end of the springs slide loosely in the slot of the other dog, thereby allowing the said clutches to work in unison, and each move in opposite directions when the springs G act upon them. When the springs are at rest they stand curved inward toward the center of the disk and the dogs D'''' all standing with their longest points D' out, and projecting beyond the surface of the said disk D. The disk D is made with an annular flange or hub H which incloses the clutch bar and springs, all as shown in Figs. 3, 4, and 8. Over the said hub H is placed a thin cover H' which is fastened to the said hub by screws fitting in apertures H''' partly shown in Fig. 3. The bar F consists of a ring encircling the shaft hole in the said clutch disk D, and having two studs or projections F' F' formed on opposite sides. Most clearly shown in Figs. 3 and 4. These studs rest against the springs G G as heretofore described. The said bar F is thin at its central part and enlarged and made heavier at each end by having a bar F'' fastened to it, this enlarged end or bar F'' working in the depression or recess F'''' in the disk and the outer end of the said bar extending through the slots I in the flattened part of the rim H, all as shown in the drawings. The said rim H is flattened on two sides where the ends of the clutch bar pass through it in order that the stud C'' may catch against the projections C''' of the bars F'' on the bar F when the said stud is forced up in releasing the clutch mechanism. The aperture in the center of the disk D is made octagonal to fit on the sleeve J which is also formed octagonal so that the said disk and sleeve must turn together for the purpose hereinafter more fully described. The hole in the bar F is made round so that the said bar can turn independent of the said sleeve. The inner part of the said aperture in the disk is turned out and made larger at K to work on the collar K' of the central disk E.

The central disk E is made to form the center of the clutch speed mechanism and cover the working parts or pinions in the pinion disk M. Most clearly shown in Fig. 9. This central disk is secured to the pinion disk M by screws N, so that the two parts will form a complete pulley wheel for running a belt on, as shown in Fig. 1. The wheels thus secured together may revolve independent of the shaft movement as each is journaled loosely on the said shaft. The disk E has an outer face E' and an inner rim E'', the inner rim forming the clutch surfaces for the clutch disk D''''. The inner part of the pinion disk M is hollow so as to admit of the pinions S T, working on the journals O, and the pinion Q Q' working on the shaft B, all of which is most clearly shown in Figs. 11, 17 and 18. The journals on pins O are cast or otherwise firmly secured to the inner part of the disk M, and the outer ends O' are reduced in size and passed through the disk E. The said disk E thereby prevents the said pinions from working off of the said journals. These pinions are of different diameters, made solid together and work loosely on the said shafts O.

The shaft B is intended to represent a main shaft or line shaft and where one of my clutch speed mechanism is to be attached to it the pinion Q or Q' is rigidly secured to the said shaft according to the manner in which the wheel is to be run. Then the sleeve is set up against it with the other pinion fast to the said sleeve, as shown in Figs. 15 and 21. In Figs. 13 and 15 the sleeve and pinion are in position for running the wheel in a forward movement or in the same direction that the shaft is moved, and at a fast or slow speed. Then by reversing the wheels S and T on the journals O, by placing the large pinions S on the outside and the small pinions T on the inside, and making a corresponding change of the pinion Q Q' on the shaft B as shown in Fig. 19, the wheel E M will run at the same speed of the shaft in running in a forward movement and by releasing the clutch disk and stopping it, the wheel E—M will then run backward at a higher rate of speed.

On Sheet 4 of the drawings the pinions are shown in Figs. 15 and 17 in a wheel fitted for fast and slow speed in a forward movement. Figs. 16 and 18 show the same pinions fitted in a wheel to run slow in a forward movement and fast in a backward movement, the pinions on the shaft shown in Fig. 19 also being arranged for the forward and backward movement. It will be understood that the shaft B is run at the same speed and in the same direction at all times in describing the various movements of the clutch speed mechanism, and that the said clutch speed mechanism is arranged for connecting motion to a second shafting or some machine as indicated and shown in Fig. 1. When the clutch speed mechanism is to be used to run the shafting at various speeds, then the drive belt is run direct from the engine on the clutch speed mechanism, as heretofore described.

In order to more fully understand the operation of my invention I will describe the action and relation of the parts to each other, also referring to the drawings having arrows indicating the various movements. In Fig. 1 my invention is shown attached to a shafting and my clutch speed mechanism driving the belt W. This wheel is running at the same speed as the line shaft B, as the arrows on the clutch wheel D indicate that it is moving. The lever bar C' is shown up, indicating that the stud C'', is down and that the clutches are holding the clutch disk D firmly to the central disk E, and in this manner the wheels are all combined and working together the same as if they were a solid pulley or belt wheel. Now in this condition of the gearing and movement of the wheels the interior pinions are all standing still, or in other words not moving, except as a solid wheel. Instantly with the moving of the lever C the stud C'' moves up in the rim causing one end of the bar F to strike the said stud at C'''. This causes the said bar to stop and in stopping, it moves in the slot F''', or in other words it stands still and the disk D moves on until the position of the bar is changed to the other side of the slot F''', as indicated in dotted lines in Fig. 3. In this position the disk remains still, and stationary with the rim A A' while instantly with the stopping of the disk D the pinion Q which is made fast to the shaft B acts on the three pinions T in the disk M causing the said disk to revolve faster than the movement of the shaft and pinions T, for the reason that the said pinion Q is larger in diameter than the pinions T. The said pinion T must therefore cause the larger pinions S to revolve at the same speed of the pinions T which are acting on the pinion Q', and as the said pinion Q' is now being held stationary by being a part of the sleeve J and the said sleeve being held stationary by the clutch disk D the movement converted to the pinions Q, S and T by the shaft B must therefore cause the whole combination of wheels and their casing or pinion M to revolve around the said shaft B at an increase of speed in proportion to the variation in the sizes of the said pinion S, T, Q and Q'.

For the forward and backward movement the pinions are arranged as follows: The large pinion Q is made fast to the sleeve J and the smaller pinion made fast to the shaft B. The pinions S T are set with the smaller ones on the outside of the journals O, all as shown in Figs. 16 and 18. Then when the shaft is running with the clutch mechanism revolving, it all runs as a solid wheel as in the other arrangement heretofore described. By moving the lever and stopping the clutch wheel the small pinion Q' acts on the large pinions S and the smaller pinions T. This causes the said pinions S and T to revolve around the stationary pinion Q and in so doing they move in an opposite direction from the movement of the shaft and pinion Q'. In their movements they travel around the said shaft at an increase of speed in proportion to the variation of sizes in the said pinions. This arrangement of the pinions is fully shown and their movements indicated by the arrows in Figs. 16 and 18. I do not limit myself to any particular use, nor to making my invention in any particular sizes, as I intend to use it for various purposes. The clutch stopping and releasing lever and mechanism may also be constructed according to the use for which the wheel is intended.

The operation of my invention will be just the same if only one or two sets of the pinions S and T are used, but I prefer the three, as they act at a less strain on each other.

The clutch disk is held to the sleeve by the nut Z, all as shown in Fig. 1.

Having thus described my invention, I claim the following:

1. In a clutch speed mechanism, the combination with an actuating shaft, of a disk loose on the shaft, interchangeable pinions of different diameters on the disk, interchangeable pinions of different diameters on the actuating shaft meshing with the pinions on the disk and means for locking the disk to the actuating shaft, substantially as described.

2. In a clutch speed mechanism, the combination with an actuating shaft, of a disk loose on the actuating shaft, pinions on the disk, a pinion rigid on the actuating shaft, a pinion sleeved on the actuating shaft the pinion on the shaft and the pinion sleeved on the shaft meshing with the pinions on the disk and means for locking from rotation the pinion sleeved on the shaft, substantially as described.

3. In a clutch speed mechanism, the combination with an actuating shaft, of a disk loose on the shaft, interchangeable pinions of different diameters on the disk, a pinion rigid on the shaft, a pinion of different diameter loosely sleeved on the shaft the pinion on the shaft and the pinion sleeved on the shaft meshing with the pinions on the disk and means for locking from rotation the pinion sleeved on the shaft, substantially as described.

4. In a clutch speed mechanism, the combination with an actuating shaft, of a disk adapted to be locked thereon, pinions of different diameters on the disk, a pinion rigid on the shaft, a pinion of different diameter loosely sleeved on the shaft the pinion rigid on the shaft and the pinion sleeved on the shaft meshing with the pinions on the disk and means for simultaneously unlocking the disk from the actuating shaft and locking the sleeved pinion from rotation, substantially as described.

5. In a clutch speed mechanism, the combination with an actuating shaft, of a pinion disk loose on the shaft, pinions on the disk, a pinion rigid on the shaft, a sleeve on the shaft, a pinion on the sleeve, the pinions rigid on the shaft and the pinion on the sleeve meshing with the pinions on the disk, a clutch disk rigid on the sleeve, mechanism in the clutch disk for clutching the said disk to the pinion disk and means for actuating the clutch mechanism, substantially as described.

6. In a clutch speed mechanism, the combination with an actuating shaft, of a pinion disk loose on the shaft, pinions on the disk, a pinion on the shaft, a sleeve on the shaft, a pinion on the sleeve the pinions on the sleeve and shaft meshing with the pinions on the disk, a clutch disk rigid on the sleeve, spring actuated dogs pivoted in the clutch disk for clutching the clutch disk to the pinion disk and means for actuating the dogs, substantially as described.

7. In a clutch speed mechanism, the combination with an actuating shaft, of a pinion disk loose on the shaft, pinions on the disk, a pinion on the shaft, a sleeve on the shaft, a pinion on the sleeve, the pinions on the sleeve and shaft meshing with the pinions on the disk, a clutch disk rigid on the sleeve, spring actuated dogs pivoted in the clutch disk for clutching the clutch disk to the pinion disk, a clutch lever within the clutch disk bearing against the springs and means for actuating the clutch lever, substantially as described.

8. In a clutch speed mechanism, the combination with an actuating shaft, of a pinion disk loose on the shaft, pinions on the disk, a pinion on the shaft, a sleeve on the shaft, a pinion on the sleeve, the pinions on the sleeve and shaft meshing with the pinions on the disk, a clutch disk rigid on the sleeve, dogs pivoted in the clutch disk for clutching the clutch disk to the pinion disk, actuating springs connecting each pair of dogs, a clutch lever within the clutch disk, studs on the clutch lever engaging the springs and means for actuating the clutch lever, substantially as described.

9. In a clutch speed mechanism, the combination with an actuating shaft, of a pinion disk loose on the shaft, pinions on the disk, a pinion on the shaft, a sleeve on the shaft, a pinion on the sleeve, the pinions on the sleeve and shaft meshing with the pinions on the disk, a clutch disk rigid on the sleeve, mechanism for clutching the clutch disk to the pinion disk, a projection arranged in the path of the mechanism and means for adjusting the projection in or out of the path of the mechanism, substantially as described.

10. In a clutch speed mechanism, the combination with an actuating shaft, of a pinion disk loose on the shaft, pinions on the disk, a pinion on the shaft, a sleeve on the shaft, a pinion on the sleeve, the pinions on the sleeve and shaft meshing with the pinions on the disk, a clutch disk rigid on the sleeve, spring actuated dogs pivoted in the clutch disk for locking the clutch disk to the pinion disk, a clutch lever within the clutch disk bearing against the springs, a projection arranged in the path of the clutch lever and means for adjusting the projection in or out of the path of said lever, substantially as described.

11. In a clutch speed mechanism, the combination with an actuating shaft, of a pinion disk loose on the shaft, pinions on the disk, a pinion on the actuating shaft, a sleeve on the shaft, a pinion on the sleeve, the pinions on the sleeve and shaft meshing with the pinions on the disk, a disk E, detachably secured to the pinion disk, an annular flange on the disk E, a clutch disk on the sleeve, dogs pivoted in the clutch disk, adapted to bear against the annular flange and means for actuating the dogs, substantially as described.

12. In a clutch speed mechanism, the combination with an actuating shaft, of a pinion disk loose on the shaft, pinions on the disk, a pinion rigid on the shaft, a sleeve on the shaft, a pinion on the sleeve, the pinions on the sleeve and shaft meshing with the pinions on the disk, a clutch disk on the sleeve, dogs pivoted in the clutch disk for clutching the clutch disk to the pinion disk, projections on the dogs, springs connecting each pair of dogs and having one end rigidly connected to the projections on one of the dogs and loosely connected to the projection on the other dog, a clutch lever in the clutch disk, studs on the clutch lever engaging the spring and means for actuating the clutch lever, substantially as described.

13. In a clutch speed mechanism, the combination with an actuating shaft, of a pinion disk loose on the shaft, a sleeve on the shaft, a pinion on the sleeve the pinions on the shaft and sleeve meshing with the pinions on the disk, a clutch disk on the sleeve, dogs pivoted in the clutch disk for clutching the clutch disk to the pinion disk, springs for actuating the dogs, a clutch lever in the clutch disk, studs on the clutch lever engaging the springs, reinforcing bars rigidly secured to the opposite ends of the clutch lever and an adjustable projection arranged in the path of the reinforcing bars of the clutch lever, substantially as described.

14. In a clutch speed mechanism, the combination with an actuating shaft, of a pinion disk loose on the shaft, pinions on the disk journaled thereon, a pinion on the shaft, a sleeve on the shaft, a pinion on the sleeve the pinions on the sleeve and shaft meshing with the pinion on the disk, a clutch lever rigid on the sleeve, dogs pivoted in the clutch disk for clutching the clutch disk to the pinion disk, springs for actuating the dogs, a recess in the side of the disk, a clutch lever surrounding the actuating shaft and working in the recess, studs on the lever engaging the springs, an annular flange on the disk having apertures therein through which the opposite ends of the clutch lever extend and an adjustable projection arranged in the path of the ends of the lever, substantially as described.

15. In a clutch speed mechanism, the combination with an actuating shaft, of a pinion disk loose on the shaft, pinions on the disk a pinion rigid on the shaft, a sleeve on the shaft, a pinion on the sleeve, the pinions on the shaft and sleeve meshing with the pinions on the disk, a clutch disk rigid on the sleeve, mechanism in the clutch disk for clutching said disk to the pinion disk and means for simultaneously releasing the clutch mechanism and locking the clutch disk from rotation, substantially as described.

In testimony whereof I affix my signature in presence of two witnesses.

JACOB REDDING.

Witnesses:
WILSON A. SHOPP,
JASON W. HOLLOWAY.